United States Patent
Singh

(10) Patent No.: US 9,766,682 B1
(45) Date of Patent: Sep. 19, 2017

(54) WAKEUP TIME SYSTEM USING DRIFT ESTIMATION

(71) Applicant: Marvell International Ltd., Hamilton HM 12 (BM)

(72) Inventor: Mahendra Singh, Santa Clara, CA (US)

(73) Assignee: Marvell International Ltd., Hamilton (BM)

(*) Notice: Subject to any disclaimer, the term of this patent is extended or adjusted under 35 U.S.C. 154(b) by 100 days.

(21) Appl. No.: 14/605,906

(22) Filed: Jan. 26, 2015

Related U.S. Application Data

(60) Provisional application No. 61/932,110, filed on Jan. 27, 2014.

(51) Int. Cl.
  *G06F 9/00* (2006.01)
  *G06F 1/32* (2006.01)
  *G06F 1/04* (2006.01)

(52) U.S. Cl.
  CPC .............. *G06F 1/3206* (2013.01); *G06F 1/04* (2013.01)

(58) Field of Classification Search
  CPC  G06F 1/08; G06F 1/3206; G06F 1/04; G01D 21/00; G01D 1/026; H03L 7/099
  USPC ......... 331/16; 455/343.1; 375/356; 713/322, 713/501; 327/106; 340/7.32; 368/47; 381/314
  See application file for complete search history.

(56) References Cited

U.S. PATENT DOCUMENTS

| | | | | |
|---|---|---|---|---|
| 6,124,764 A | * | 9/2000 | Haartsen | H03J 7/06 327/106 |
| 6,452,181 B1 | * | 9/2002 | Glass | G01C 11/00 250/332 |
| 6,473,607 B1 | * | 10/2002 | Shohara | H04W 52/0216 340/7.32 |
| 7,272,078 B1 | * | 9/2007 | Haartsen | H03L 7/00 324/76.41 |
| 2005/0151592 A1 | * | 7/2005 | Partridge | H03B 5/04 331/16 |
| 2006/0149984 A1 | * | 7/2006 | Yasumoto | G01S 19/23 713/322 |
| 2006/0205382 A1 | * | 9/2006 | Wang | H04W 52/029 455/343.1 |
| 2007/0105525 A1 | * | 5/2007 | Wang | H04W 52/029 455/343.1 |
| 2007/0194924 A1 | * | 8/2007 | Karr | G01S 13/765 340/572.1 |

(Continued)

*Primary Examiner* — Aurel Prifti

(57) ABSTRACT

An apparatus includes a sleep clock circuit that generates a sleep clock signal and an accurate clock circuit that, when on, generates an accurate clock signal. The apparatus is configured to enter a sleep mode, generate sleep clock measurements by measuring the sleep clock signal using the accurate clock signal during an initial sleep interval, estimate a cumulative error using the sleep clock measurements, and determine a final sleep interval using the cumulative error. A method includes determining a duration of an initial sleep interval and generating measurements of a sleep clock signal using an accurate clock signal. The measurements of the sleep clock signal correspond to sampling intervals within the initial sleep interval. A cumulative error value is generated according to the measurements, and a duration of a final sleep interval is determined according to the cumulative error value.

21 Claims, 3 Drawing Sheets

(56) References Cited

U.S. PATENT DOCUMENTS

| | | | | |
|---|---|---|---|---|
| 2009/0016474 | A1* | 1/2009 | Bertorelle | H04W 52/029 |
| | | | | 375/356 |
| 2009/0296531 | A1* | 12/2009 | Haartsen | H03L 1/00 |
| | | | | 368/47 |
| 2011/0150251 | A1* | 6/2011 | Solum | H04R 25/554 |
| | | | | 381/314 |
| 2015/0074444 | A1* | 3/2015 | Meyer | G06F 1/12 |
| | | | | 713/501 |

* cited by examiner

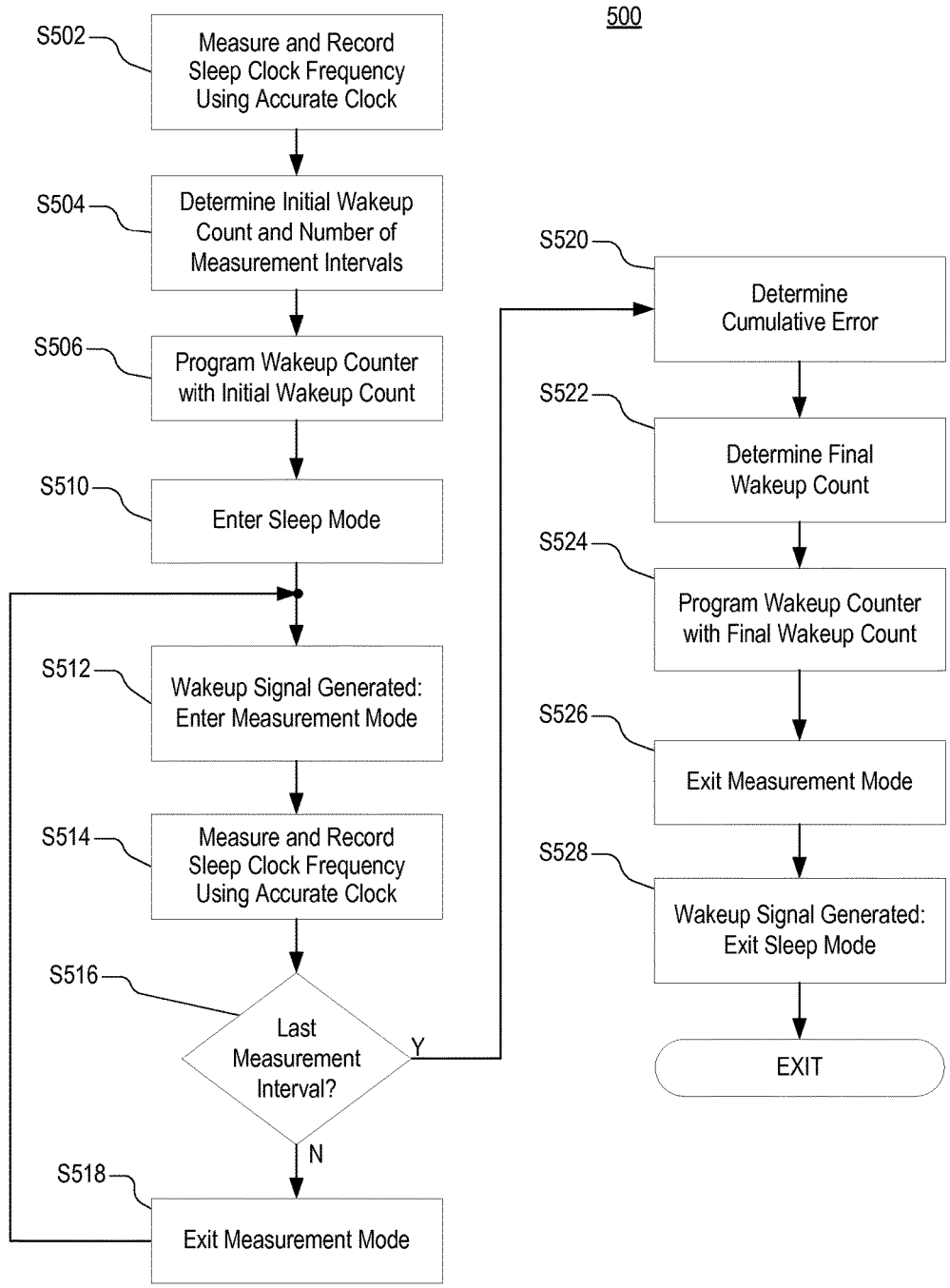

WAKEUP TIME SYSTEM USING DRIFT ESTIMATION

CROSS REFERENCE TO RELATED APPLICATION

This present disclosure claims the benefit of U.S. Provisional Application No. 61/932,110, filed on Jan. 27, 2014, which is incorporated by reference herein in its entirety.

BACKGROUND

An electronic system may be placed into a sleep mode to reduce power consumption. During the sleep mode, a portion of the circuits in the electronic system may have a clock signal turned off or operated at a reduced frequency, have a voltage of a power supply voltage removed or reduced, or both.

The electronic system may be configured to wake from the sleep mode at a programmed time. Wakeup circuits that wake the electronic system may be designed for low power operation. However, the wakeup circuits may not keep time accurately, or may keep time accurately but require additional components that increase the cost of the electronic system.

SUMMARY

In an embodiment, an apparatus includes a sleep clock circuit configured to generate a sleep clock signal and an accurate clock circuit configured to generate an accurate clock signal when the accurate clock circuit is turned on. The apparatus is configured to enter a sleep mode, generate a plurality of sleep clock measurements by measuring the sleep clock signal using the accurate clock signal during an initial sleep interval occurring during the sleep mode, estimate a cumulative error according to the plurality of sleep clock measurements, and determine a final sleep interval according to the cumulative error.

In an embodiment, measuring the sleep clock signal using the accurate clock signal while in the sleep mode includes turning on the accurate clock circuit, generating a count of transitions of the accurate clock signal that occur during one or more clock cycles of the sleep clock signal, and turning off the accurate clock circuit.

In an embodiment, the apparatus includes a wakeup counter circuit configured to receive the sleep clock signal and periodically generate a wakeup signal according to the sleep clock signal. The apparatus is configured to measure the sleep clock signal using the accurate clock signal when the wakeup counter circuit generates the wakeup signal while the apparatus is in the sleep mode.

In an embodiment, the apparatus is configured to measure the sleep clock signal to produce a pre-sleep measurement of the sleep clock signal using the accurate clock signal before entering the sleep mode. The cumulative error is estimated according to the pre-sleep measurement of the sleep clock signal.

In an embodiment, estimating the cumulative error includes estimating, using a piecewise linear estimate based on two of the plurality of sleep clock measurements, a frequency of the sleep clock signal or a cycle time of the sleep clock signal.

In an embodiment, estimating the cumulative error includes estimating, using a curve fitting process based on the plurality of the sleep clock measurements, a frequency of the sleep clock signal or a cycle time of the sleep clock signal.

In an embodiment, the sleep clock circuit includes one or more of a relaxation oscillator circuit, a ring oscillator circuit, and a low frequency clock source similar thereto.

In an embodiment, the accurate clock circuit is a clock circuit of a communication subsystem of the apparatus.

In an embodiment, a method of providing an accurate wakeup time includes determining a duration of an initial sleep interval using a controller circuit and generating a plurality of measurements of a sleep clock signal using an accurate clock signal. The initial sleep interval includes a plurality of sampling intervals, and the plurality of measurements of the sleep clock signal correspond to the plurality of sampling intervals, respectively. The method further includes generating a cumulative error value according to the plurality of measurements of the sleep clock signal, and determining a duration of a final sleep interval according to the cumulative error value.

In an embodiment, generating the cumulative error value includes estimating, using the plurality of measurements of the sleep clock signal, a plurality of frequencies of the sleep clock signal.

In an embodiment, the method includes estimating the plurality of frequencies of the sleep clock signal according to a piecewise linear estimation based on the plurality of measurements of the sleep clock signal.

In an embodiment, the method includes estimating the plurality of frequencies of the sleep clock signal according to a result of a curve fitting process applied to the plurality of measurements of the sleep clock signal.

In an embodiment, generating the plurality of measurements of the sleep clock signal during the initial sleep interval includes turning on the accurate clock circuit to generate the accurate clock signal, generating the measurements according to a count of transitions of the accurate clock signal occurring between first and second transitions of the sleep clock signal, and turning off the accurate clock circuit.

In an embodiment, the method includes determining an initial wakeup count value according to the duration of the initial sleep interval, a number of the sampling intervals, and an estimate of a frequency of the sleep clock signal, determining a count of transitions of the sleep clock signal, generating a wakeup signal according to the count of transitions of the sleep clock signal and the initial wakeup count value, and resetting the count of transitions of the sleep clock signal and generating a measurement of the plurality of measurements of a sleep clock signal when the wakeup signal is generated during the initial sleep interval.

In an embodiment, the method includes determining a final wakeup count value according to the duration of the final sleep interval and an estimate of a frequency of the sleep clock signal, determining a count of transitions of the sleep clock signal, and generating a wakeup signal according to the count of transitions of the sleep clock signal and the final wakeup count.

In an embodiment, the method includes generating the sleep clock signal using a ring oscillator or a relaxation oscillator.

In an embodiment, a difference between the duration of the initial sleep intervals and a sleep target duration is less than a duration of a sampling interval of the plurality of sampling intervals.

BRIEF DESCRIPTION OF THE DRAWINGS

FIG. 5 is a flowchart of a process for determining a wakeup time using drift estimation according to an embodiment.

DETAILED DESCRIPTION

Figure 1:
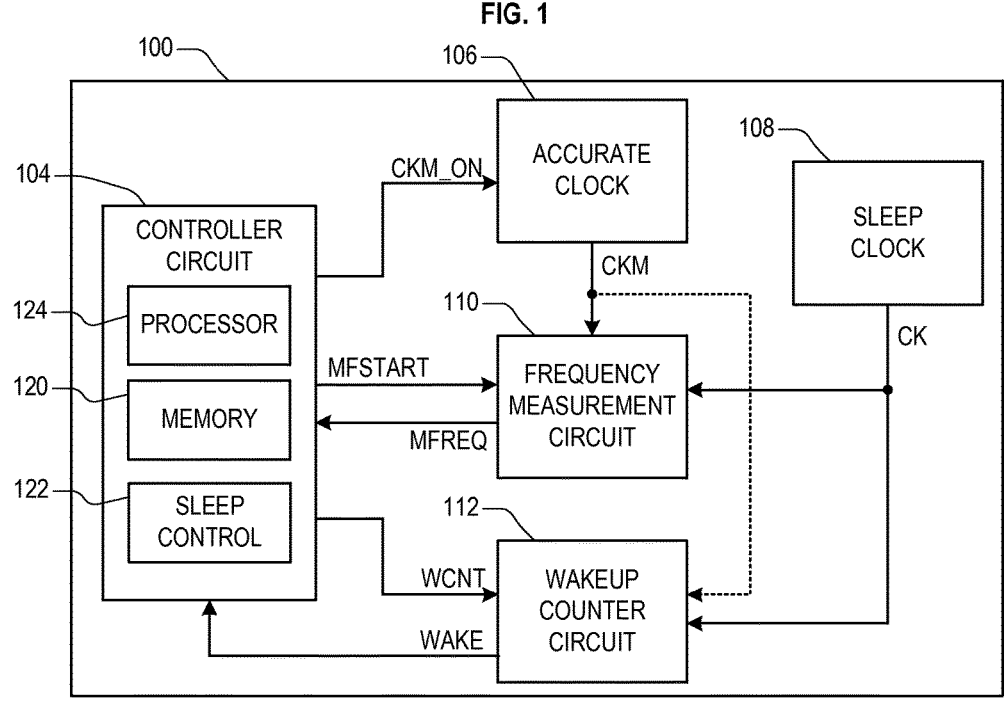
FIG. 1 illustrates an electronic system according to an embodiment.

FIG. 1A illustrates an electronic system 100 according to an embodiment. The electronic system 100 includes a controller circuit 104, an accurate clock circuit 106, a sleep clock circuit 108, a frequency measurement circuit 110, and a wakeup counter circuit 112.

The controller circuit 104 includes a memory 120, a sleep control circuit 122, and a processor 124. The memory 120 includes non-transitory computer-readable media, which non-transitory computer-readable media may include one or more of Static Random Access Memory (SRAM), a Dynamic Random Access Memory (DRAM), Flash memory, Read Only Memory (ROM), and the like. The memory 120 may also include one or more of latch circuits and register circuits.

The processor 124 may include one or more of a microcontroller and a microprocessor. The processor 124 is configured to execute computer programming instructions stored in the memory 120 and to read and write data in the memory 120. By way of example and not by way of limitation, one or more functions of the controller circuit 104 are provided by using the processor 124 to execute computer program instructions stored in the memory 120.

The sleep control circuit 122 provides one or more functions of the controller circuit 104 when the electronic system 100 is in a sleep mode. The sleep control circuit 122 may include one or more of a microcontroller, a sequencer, a Finite State Machine (FSM), and the like. The sleep control circuit 122 may also contain one or more register, memory, and the like. The sleep control circuit 122 may be initialized by the processor 124 prior to the electronic system 100 entering the sleep mode.

In an embodiment, when the electronic system 100 is in the sleep mode, the sleep control circuit 122 is active and one or more of the processor 124, the memory 120, and other circuits within the controller circuit 104 are inactive. When a circuit is active, the circuit is provided with a supply voltage and a clock signal. When the circuit is inactive, the circuit is not provided with the supply voltage, not provided with the clock signal, or both.

In an embodiment, when the electronic system 100 is in the sleep mode, one or more of the processor 124, the memory 120, and other circuits within the controller circuit 104 operate in a low power mode to provide one or more functions of the controller circuit 104. In an embodiment, a circuit in a low power mode operates at a reduced clock frequency, at a reduced supply voltage, or both, relative to when the circuit is active and not in the sleep mode.

The accurate clock circuit 106 receives a clock-on signal CKM_ON from the controller circuit 104. The clock-on signal CKM_ON operates to turn the accurate clock circuit 106 off and on. When on, the accurate clock circuit 106 is configured to provide an accurate clock signal CKM.

The accurate clock circuit 106 includes an oscillator that generates a precise frequency that does not vary substantially in response to changes in one or more of a value of a power supply voltage, a temperature, and other environmental factors. In an embodiment, the oscillator is a temperature-compensated crystal oscillator. In an embodiment, the oscillator is an oscillator of a communication subsystem of the electronic device, such as a WiFi™ subsystem, a Bluetooth® subsystem, a cellular radio subsystem, a Global Position System (GPS) subsystem, or the like.

The sleep clock circuit 108 is configured to provide a sleep clock signal CK. The sleep clock circuit 108 includes a low power oscillator such as a relaxation oscillator (e.g., a Resistor-Capacitor (RC) oscillator), a ring oscillator, and the like. The sleep clock signal CK provided by the sleep clock circuit 108 has a frequency that is substantially lower than a frequency of the accurate clock signal CKM provided by the accurate clock circuit 106. For example, in an embodiment the frequency of the sleep clock signal CK is about 32 kilohertz (KHz), while the frequency of the accurate clock signal CKM is tens or hundreds of megahertz (MHz). In an embodiment, the accurate clock signal CKM is a main system clock generated using a crystal oscillator such as a Temperature Compensated Crystal Oscillator (TCXO).

The frequency of the sleep clock signal CK may vary according to variations in a temperature or a power supply voltage of the electronic system 100. The frequency of the sleep clock signal CK may also vary according to variations in a process used to manufacture the electronic system 100 and to changes in properties of components of the electronic system 100 over time.

The frequency measurement circuit 110 is configured to measure a frequency of the sleep clock signal CK using the accurate clock signal CKM. The frequency measurement circuit 110 receives a measurement start signal MFSTART from the controller circuit 104. In an embodiment, the measurement start signal MFSTART is generated by the sleep control circuit 122 of the controller circuit 104 while one or more of the processor 124, memory 120, and other circuits of the controller circuit are inactive.

In an embodiment, the frequency measurement circuit 110 includes a Finite State Machine (FSM) configured to generate the measurement start signal MFSTART. The FSM of the frequency measurement circuit 110 may be initialized by the controller circuit 104 prior to the electronic system 100 entering the sleep mode. In an embodiment, operations described as being performed by the controller circuit 104 during the sleep mode, a sleep clock measurement mode, or both are instead performed by the FSM of the frequency measurement circuit 110.

In an embodiment, the frequency measurement circuit 110 includes a memory or registers, and information described as being stored in the memory or registers of the controller circuit 104 during the sleep mode, the sleep clock measurement mode, or both may instead be stored in the memory or registers of the frequency measurement circuit 110.

Subsequently, the frequency measurement circuit 110 provides a measured frequency signal MFREQ to the controller circuit 104. In an embodiment, the frequency measurement circuit 110 provides the measured frequency signal MFREQ to the controller circuit 104 before conducting another measurement. In another embodiment, the frequency measurement circuit 110 is configured to store a plurality of measured frequency signals MFREQ internally and provide the plurality of measured frequency signals MFREQ to the controller circuit 104 after a final measurement is performed, after a predetermined number of measurements are performed, or both.

In an embodiment, the frequency measurement circuit 110 is configured to measure the frequency of the sleep clock signal CK by counting transitions of the accurate clock signal CKM that occur between first and second transitions of the sleep clock signal CK. A person of skill in the art in light of the teachings and disclosures herein would be aware of a variety of other techniques for determining the frequency of the sleep clock signal CK using the accurate clock signal CKM.

The wakeup counter circuit 112 receives the sleep clock signal CK from the sleep clock circuit 108 and a wakeup count value WCNT from the controller circuit 104. In an implementation, when the wakeup count value WCNT is received, a counter in the wakeup counter circuit 112 is initialized and then updated during subsequent clock cycles of the sleep clock signal CK. In another implementation, the counter in the wakeup counter circuit 112 is initialized when a system sleep signal is received, the system sleep signal indicating the entry of the electronic system 100 into the sleep mode. In an embodiment, the wakeup counter circuit 112 receives the accurate clock signal CKM when the accurate clock circuit 106 is turned on, as shown by the dotted line in FIG. 1.

In an implementation, the wakeup count value WCNT may be retained from one occurrence of the sleep mode to the next, and therefore may not be received from the controller circuit 104 before some entries into the sleep mode.

When the counter, upon being updated, reaches or exceeds a target value, the wakeup counter circuit 112 generates a wakeup signal WAKE. In an embodiment, the counter is then initialized again (i.e. is re-initialized) and continues to be updated during subsequent clock cycles of the sleep clock signal CK. In another the embodiment, when the counter reaches or exceeds the target value, the target value is updated according to the wakeup count value WCNT and the counter is not reinitialized.

In an embodiment, when the wakeup counter circuit 112 receives the wakeup count value WCNT, the wakeup counter circuit 112 stores the wakeup count value WCNT in a target register and initializes the counter to zero. The wakeup counter circuit 112 then increments a value of the counter during each subsequent clock cycle of the sleep clock signal CK and compares the value of the counter to the wakeup count value WCNT stored in the target register. When the value of the counter is equal to (or, if the wakeup count value WCNT is altered while the counter is counting, greater than) the value stored in the target register, the wakeup counter circuit 112 generates the wakeup signal WAKE, initializes the counter to zero, and continues incrementing the counter during each subsequent clock cycle of the sleep clock signal CK.

A person of skill in the art in light of the teachings and disclosures herein would be aware of a variety of other techniques for implementing the wakeup counter circuit 112.

Figure 2:
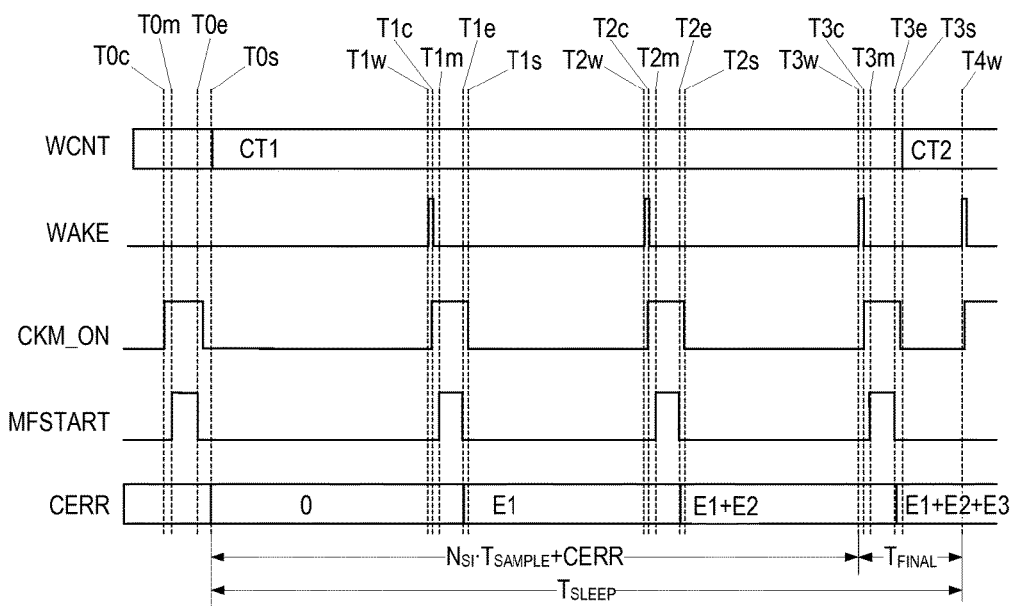
FIG. 2 is a waveform diagram illustrating an operation of the electronic system of FIG. 1 according to an embodiment.

FIG. 2 is a waveform diagram illustrating an operation of the electronic system 100 of FIG. 1 according to an embodiment. FIG. 2 illustrates operation of the electronic system 100 during time periods when the electronic system 100 is preparing for, entering in, and exiting a sleep mode that corresponds to a target sleep time (or target sleep duration) $T_{SLEEP}$.

At a pre-sleep clock turn on time T0c, the controller circuit 104 prepares to measure a frequency of the sleep clock signal CK by asserting the clock-on signal CKM_ON.

As a result, the accurate clock circuit 106 turns on and provides the accurate clock signal CKM to the frequency measurement circuit 110. In an embodiment, the accurate clock circuit 106 may already be turned on at the pre-sleep clock turn on time T0c.

At a pre-sleep measurement start time T0m, the controller circuit 104 asserts the measurement start signal MFSTART. As a result, the frequency measurement circuit 110 begins measuring, using the accurate clock signal CKM, the frequency of the sleep clock signal CK. In an embodiment, the pre-sleep measurement start time T0m is delayed from the pre-sleep clock turn on time T0c by a time period sufficient to allow the accurate clock circuit 106 to stabilize after being turned on.

At a pre-sleep measurement end time T0e, the frequency measurement circuit 110 completes the measurement of the frequency of the sleep clock signal CK and provides a first measured frequency value MF1 as the measured frequency signal MFREQ to the controller circuit 104. In an embodiment, the measured frequency signal MFREQ includes a count of the number of clock cycles of the accurate clock signal CKM that occurred during a predetermined number of clock cycles of the sleep clock signal CK.

After the pre-sleep measurement end time T0e, the controller circuit 104 de-asserts the clock-on signal CKM_ON and the accurate clock circuit 106 is turned off. In an embodiment, the controller circuit 104 stores the first measured frequency value MF1 in the memory 120. In another embodiment, the frequency measurement circuit 110 is configured to store the first measured frequency value MF1 internally and provide the first measured frequency value MF1 to the controller circuit 104 after a final measurement is performed, after a predetermined number of measurements are performed, or both.

In an embodiment, the first measured frequency value MF1 includes a first measured cycle time $T_{CK\_M1}$ of the sleep clock signal CK. In an embodiment, the first measured cycle time $T_{CK\_M1}$ includes a count of a number of clock cycles of the accurate clock signal CKM.

After the controller circuit 104 receives the measured frequency signal MFREQ, the controller circuit 104 computes an initial wakeup count value CT1 and provides the initial wakeup count value CT1 as the value of the wakeup count value WCNT. The initial wakeup count value CT1 is determined according to a duration of a sampling interval $T_{SAMPLE}$, and an estimated frequency $F_{EST}$ of the sleep clock signal CK during the time the electronic system 100 is in the sleep mode.

The sampling interval $T_{SAMPLE}$ may be determined according to one or more of a target sleep duration $T_{SLEEP}$, a power budget, and an expected drift of the frequency of the sleep clock signal CK. The estimated frequency $F_{EST}$ of the sleep clock signal CK may be determined according to one or more of the first measured frequency value MF1, data collected during previous time periods when the electronic system 100 is in a sleep mode, characterization data determined during a manufacturing process, and calibration data determined during a calibration process.

In an embodiment, the estimated frequency $F_{EST}$ of the sleep clock signal CK includes an estimated cycle time $T_{CK\_EST}$ of the sleep clock signal CK. In an embodiment, the estimated cycle time $T_{CK\_EST}$ includes a count of a number of clock cycles of the accurate clock signal CKM.

In an embodiment, the duration of the sampling interval $T_{SAMPLE}$ is determined according to Equation 1, below, wherein $N_{SI}$ is a predetermined number of sampling intervals, $T_{BUFFER}$ is a duration of a buffer interval, and $\lfloor x \rfloor$ is the function floor(x) indicating the largest integer not greater than x:

$$T_{SAMPLE} = \left\lfloor \frac{T_{SLEEP} - T_{BUFFER}}{N_{SI}} \right\rfloor. \quad \text{(Equation 1)}$$

In an embodiment, the duration of the sampling interval $T_{SAMPLE}$ is between 200 and 300 milliseconds.

A person of skill in the art in light of the teachings and disclosures herein would understand that the relationship shown in Equation 1 could also be used to determine a number of sampling intervals $N_{SI}$ according to a predetermined duration of the sampling interval $T_{SAMPLE}$.

The buffer interval $T_{BUFFER}$ may be determined according to Equation 2, below, in which $CK_{DRIFT}$ is the expected drift of frequency of the sleep clock signal CK expressed as a percentage and $T_{ERRM}$ is a predetermined interval of time selected to provide a margin for error:

$$T_{BUFFER} = CK_{DRIFT} \cdot T_{SLEEP} + T_{ERRM} \quad \text{(Equation 2).}$$

The first wakeup count CT1 may be determined according to Equation 3:

$$CT1 = \frac{T_{SAMPLE}}{F_{EST}}. \quad \text{(Equation 3)}$$

The controller circuit 104 provides the first wakeup count CT1 to the wakeup counter circuit 112 as the wakeup clock value WCNT. At a sleep start time T0s, the controller circuit 104 places the electronic circuit 100 into the sleep mode. In an embodiment, placing the electronic circuit 100 into the sleep mode includes turning on the sleep clock circuit 108. In another embodiment, the sleep clock circuit 108 is on at all times.

In an embodiment, one or more of the pre-sleep clock turn on time T0c, the pre-sleep measurement start time T0m, and the pre-sleep measurement end time T0e are synchronized with the sleep start time T0s by an interval corresponding to a known number of clock cycles of the sleep clock signal CK.

At a first wakeup time T1w, the wakeup counter circuit 112 determines that a count of clock cycles of the sleep clock signal CK is equal to or greater than the initial wakeup count value CT1 and as a result asserts the wakeup signal WAKE. In an embodiment, the wakeup counter circuit 112 reinitializes the counter of the wakeup counter circuit 112 when the wakeup signal WAKE is asserted, and the counter continues being updated during subsequent clock cycles of the sleep clock signal CK. The wakeup signal WAKE does not cause the entire electronic system 100 or the entire controller circuit 104 to exit the sleep mode.

In response to the assertion of the wakeup signal WAKE at the first wakeup time T1w, the electronic system 100 enters a sleep clock measurement mode that is concurrent with the sleep mode. In an embodiment, the sleep clock measurement mode is a sub-mode of the sleep mode. For example, in an embodiment, a portion of the electronic system 100 made inactive when the sleep mode was entered is also inactive during the sleep clock measurement mode, a system sleep signal that has a sleeping value when the electronic system 100 is in the sleep mode also has the sleeping value when the system is in the sleep clock measurement mode, and the target sleep time $T_{SLEEP}$ includes the duration of the sleep clock measurement mode. In an embodiment, the sleep control circuit 122 controls operations performed when the electronic system 100 is in the sleep clock measurement mode.

While in the sleep clock measurement mode, portions of the electronic system 100 not normally on in the sleep mode may be on, and clock signals not normally provided during the sleep mode may be provided. For example, the sleep control circuit 122 of the controller circuit 104 may be off when the electronic system 100 is in the sleep mode, and on and provided with a clock signal when the electronic system 100 is in the sleep clock measurement mode.

At a first clock turn on time T1c, the controller circuit 104 prepares to measure a frequency of the sleep clock signal CK by asserting the clock-on signal CKM_ON signal. As a result, the accurate clock circuit 106 turns on and provides the accurate clock signal CKM to the frequency measurement circuit 110.

At a first measurement start time T1m, the controller circuit 104 asserts the measurement start signal MFSTART. As a result, the frequency measurement circuit 110 begins measuring, using the accurate clock signal CKM, the frequency of the sleep clock signal CK. In an embodiment, the first measurement start time T1m is delayed from the first clock turn on time T1c by a time period sufficient to allow the accurate clock circuit 106 to stabilize after being turned on.

At a first measurement end time T1e, the frequency measurement circuit 110 completes the measurement of the frequency of the sleep clock signal CK and provides a second measured frequency value MF2 as the measured frequency signal MFREQ to the controller circuit 104. In an embodiment, the measured frequency signal MFREQ includes a count of the number of clock cycles of the accurate clock signal CKM that occurred during a predetermined number of clock cycles of the sleep clock signal CK.

After the first measurement end time T1e, the controller circuit 104 de-asserts the clock-on signal CKM_ON and the accurate clock circuit 106 is turned off. The controller circuit 104 stores the second measured frequency value MF2 in the memory 120 or a register of the controller circuit 104. In an embodiment, the second measured frequency value MF2 includes a second measured cycle time $T_{CK\_M2}$ of the sleep clock signal CK. In an embodiment, the second measured cycle time $T_{CK\_M2}$ includes a count of a number of clock cycles of the accurate clock signal CKM.

After the controller circuit 104 receives the measured frequency signal MFREQ, the controller circuit 104 computes a first error value E1 according to the first and second measured frequency values MF1 and MF2. In an embodiment, the controller circuit 104 computes a first average frequency $F_{AVE1}=(MF1+MF2)/2$ and computes the first error value E1 according to Equation 4, where $F_{EST}$ is a value of the estimated frequency $F_{EST}$ of the sleep clock signal CK and CT1 is the value of the initial wakeup count value CT1:

$$E1 = CT1 \cdot \left( \frac{1}{F_{EST}} - \frac{1}{F_{AVE1}} \right). \quad \text{(Equation 4)}$$

In another embodiment, the controller circuit 104 computes a first average cycle time $T_{CK\_AVE1}$ of the sleep clock signal CK according to the first and second measured cycle times $T_{CK\_M1}$ and $T_{CK\_M2}$, for example, $T_{CK\_AVE1} = (T_{CK\_M1} + T_{CK\_M2})/2$, and computes the first error value E1 according to Equation 5, wherein $T_{CK\_EST}$ is a value of the estimated cycle time $T_{CK\_EST}$ of the sleep clock signal CK and CT1 is the value of the initial wakeup count value CT1:

$$E1=CT1 \cdot (T_{CK\_EST}-T_{CK\_AVE1})$$ (Equation 5).

In an embodiment, the calculations shown in Equation 4 or Equation 5 are performed after each measurement of the frequency of the sleep clock signal CK. In another embodiment, the calculations shown in Equation 4 or Equation 5 are not performed each time a measurement is performed, and are instead performed using a plurality of measured frequency signals MFREQ stored in the frequency measurement circuit 110, the controller circuit 104, or both, after a plurality of measurements of the frequency of the sleep clock CK have been performed.

For example, the calculations of Equation 4 or Equation 5 may be performed at a predetermined time before a final measurement of the frequency of the sleep clock signal CK is performed, or the calculations may be performed after the final measurement and before the sleep mode is finally exited. In an embodiment, the calculations of Equation 4 or Equation 5 are performed while another action is being performed at a time before a final sleep interval $T_{FINAL}$, shown in FIG. 2 and described below.

A person of skill in the art in light of the teachings and disclosures herein would recognize that an estimate or measurement of a frequency of a signal is intrinsically equivalent to an estimate or measurement, respectively, of a cycle time of the signal. Furthermore, a person of skill in the art in light of the teachings and disclosures herein would understand that a frequency may be represented by an equivalent cycle time, a cycle time may be represented by an equivalent frequency, an estimate or measurement of a frequency may be performed by estimating or measuring, respectively, a cycle time, and an estimate or measurement of a cycle time may be performed by estimating or measuring, respectively, a frequency.

The cumulative error value CERR is an estimate of the cumulative drift of the sleep clock signal CK. The controller circuit 104 sets a cumulative error value CERR to the first error value E1 and stores the cumulative error value CERR in the memory 120. In an embodiment, the controller circuit 104 also stores the first error value E1 in the memory 120.

At a first sleep reentry time T1s, the controller circuit 104 exits the sleep clock measurement mode and continues operating in the sleep mode. In an embodiment, the duration of the interval between the first wakeup time T1w and the first sleep reentry time T1s is 1 to 3 milliseconds. In an embodiment, the first sleep reentry time T1s is substantially the same as the first measurement end time T1e.

At a second wakeup time T2w, the wakeup counter circuit 112 determines that a count of clock cycles of the sleep clock signal CK is again equal to or greater than the initial wakeup count value CT1 and as a result asserts the wakeup signal WAKE. In an embodiment, the wakeup counter circuit 112 reinitializes the counter of the wakeup counter circuit 112 when the wakeup signal WAKE is asserted, and the counter continues being updated during subsequent clock cycles of the sleep clock signal CK.

In response to the assertion of the wakeup signal WAKE at the second wakeup time T2w, the electronic system 100 reenters the sleep clock measurement mode.

At a second clock turn on time T2c, the controller circuit 104 prepares to measure the frequency of the sleep clock signal CK by asserting the clock-on signal CKM_ON signal. As a result, the accurate clock circuit 106 turns on and provides the accurate clock signal CKM to the frequency measurement circuit 110.

At a second measurement start time T2m, the controller circuit 104 asserts the measurement start signal MFSTART. As a result, the frequency measurement circuit 110 begins measuring, using the accurate clock signal CKM, the frequency of the sleep clock signal CK. In an embodiment, the second measurement start time T2m is delayed from the second clock turn on time T2c by a time period sufficient to allow the accurate clock circuit 106 to stabilize after being turned on.

At a second measurement end time T2e, the frequency measurement circuit 110 completes the measurement of the frequency of the sleep clock signal CK and provides a third measured frequency value MF3 as the measured frequency signal MFREQ to the controller circuit 104. In an embodiment, the measured frequency signal MFREQ includes a count of clock cycles of the accurate clock signal CKM that occurred during a predetermined number of clock cycles of the sleep clock signal CK.

After the second measurement end time T2e, the controller circuit 104 de-asserts the clock-on signal CKM_ON and the accurate clock circuit 106 is turned off. The controller circuit 104 stores the third measured frequency value MF3 in the memory 120. In an embodiment, the third measured frequency value MF3 includes a third measured cycle time $T_{CK\_M3}$ of the sleep clock signal CK. In an embodiment, the third measured cycle time $T_{CK\_M3}$ includes a count of a number of clock cycles of the accurate clock signal CKM.

After the controller circuit 104 receives the measured frequency signal MFREQ, the controller circuit 104 computes a second error value E2 according to the second and third measured frequency values MF2 and MF3. In an embodiment, the controller circuit 104 computes an second average frequency $F_{AVE2}=(MF2+MF3)/2$ and computes the second error value E2 according to Equation 6, wherein $F_{EST}$ is the value of the estimated frequency $F_{EST}$ of the sleep clock signal CK and CT1 is the value of the initial wakeup count value CT1:

$$E2 = CT1 \cdot \left( \frac{1}{F_{EST}} - \frac{1}{F_{AVE2}} \right).$$ (Equation 6)

In another embodiment, the controller circuit 104 computes a second average cycle time $T_{CK\_AVE2}$ according to the second and third measured cycle times $T_{CK\_M2}$ and $T_{CK\_M3}$, and computes the second error value E2 according to Equation 7, wherein $T_{CK\_EST}$ is the value of the estimated cycle time $T_{CK\_EST}$ of the sleep clock signal CK:

$$E2=CT1 \cdot (T_{CK\_EST}-T_{CK\_AVE2})$$ (Equation 7).

The controller circuit 104 adds the second error value E2 to the cumulative error value CERR to update the cumulative error value CERR, and stores the updated cumulative error value CERR in the memory 120. In an embodiment, the controller circuit 104 stores the second error value E2 in the memory 120.

In an embodiment, one or more of the calculations shown in Equation 6, the calculations shown in Equation 7, and the update of the cumulative error value CERR may be performed before a second sleep reentry time T2s. In another embodiment, one or more of the calculations shown in Equation 6, Equation 7, and the update of the cumulative error value CERR may instead be performed using a plurality of measured frequency signals MFREQ stored in the frequency measurement circuit 110, the controller circuit 104, or both, after a plurality of measurements of the frequency of the sleep clock signal CK have been performed, similar to as described for the calculations of Equations 4 and 5, above.

At the second sleep reentry time T2s, the controller circuit 104 exits the sleep measurement mode and continues operating in the sleep mode.

At a third wakeup time T3w, the wakeup counter circuit 112 determines that a count of clock cycles of the sleep clock signal CK is again equal to or greater than the initial wakeup count value CT1 and as a result asserts the wakeup signal WAKE. In an embodiment, the wakeup counter circuit 112 reinitializes the counter of the wakeup counter circuit 112 when the wakeup signal WAKE is asserted, and the counter continues being updated during subsequent clock cycles of the sleep clock signal CK.

In response to the assertion of the wakeup signal WAKE at the third wakeup time T3w, the electronic system 100 exits the sleep mode and reenters the sleep clock measurement mode.

At a third clock turn on time T3c, the controller circuit 104 prepares to measure the frequency of the sleep clock signal CK by asserting the clock-on signal CKM_ON signal. As a result, the accurate clock circuit 106 turns on and provides the accurate clock signal CKM.

At a third measurement start time T3m, the controller circuit 104 asserts the measurement start signal MFSTART. As a result, the frequency measurement circuit 110 begins measuring, using the accurate clock signal CKM, the frequency of the sleep clock signal CK. In an embodiment, the third measurement start time T3m is delayed from the third clock turn on time T3c by a time period sufficient to allow the accurate clock circuit 106 to stabilize after being turned on.

At a third measurement end time T3e, the frequency measurement circuit 110 completes the measurement of the frequency of the sleep clock signal CK and provides a fourth measured frequency value MF4 as the measured frequency signal MFREQ to the controller circuit 104. In an embodiment, the measured frequency signal MFREQ includes a count of clock cycles of the accurate clock signal CKM that occurred during a predetermined number of clock cycles of the sleep clock signal CK.

After the third measurement end time T3e, the controller circuit 104 de-asserts the clock-on signal CKM_ON and the accurate clock circuit 106 is turned off. The controller circuit 104 stores the fourth measured frequency value MF4 in the memory 120. In an embodiment, the fourth measured frequency value MF4 includes a fourth measured cycle time $T_{CK\_M4}$ of the sleep clock signal CK. In an embodiment, the fourth measured cycle time $T_{CK\_M4}$ includes a count clock cycles of the accurate clock signal CKM.

After the controller circuit 104 receives the measured frequency signal MFREQ, the controller circuit 104 computes a third error value E3 according to the third and fourth measured frequency values MF3 and MF4. In an embodiment, the controller circuit 104 computes a third average frequency $F_{AVE3}=(MF3+MF4)/2$ and computes the third error value E3 according to Equation 8, wherein $F_{EST}$ is the value of the estimated frequency $F_{EST}$ of the sleep clock signal CK and CT1 is the value of the initial wakeup count value CT1:

$$E3 = CT1 \cdot \left( \frac{1}{F_{EST}} - \frac{1}{F_{AVE3}} \right).$$ (Equation 8)

In another embodiment, the controller circuit 104 computes a third average cycle time $T_{CK\_AVE3}$ according to the third and fourth measured cycle times $T_{CK\_M3}$ and $T_{CK\_M4}$, and computes the third error value E3 according to Equation 9, wherein $T_{CK\_EST}$ is the value of the estimated cycle time $T_{CK\_EST}$ of the sleep clock signal CK:

$$E3 = CT1 \cdot (T_{CK\_EST} - T_{CK\_AVE3})$$ (Equation 9).

The controller circuit 104 adds the third error value E3 to the cumulative error value CERR to update the cumulative error value CERR, and stores the updated cumulative error value CERR in the memory 120. In an embodiment, the controller circuit 104 stores the third error value E3 in the memory 120.

In FIG. 2, the third wakeup time T3w is the last wakeup time that will occur before the end of the target sleep time $T_{SLEEP}$, that is, the number of sampling intervals $N_{SI}$ in the example shown in FIG. 2 is three. Because the third wakeup time T3w is the last wakeup time, the controller circuit 104 determine a duration of the final sleep interval $T_{FINAL}$ according to one or more of the cumulative error value CERR; the first, second, and third error values E1, E2, and E3; and the first, second, third, and fourth measured frequency values MF1, MF2, MF3, MF4.

Although the example shown in FIG. 2 has a number of sampling intervals $N_{SI}$ equal to three, embodiments are not limited thereto, and any value may be used for the number of sampling intervals $N_{SI}$. For example, given a target sleep time $T_{SLEEP}$ of 10 seconds, the number of sampling intervals $N_{SI}$ may be 39 and a sampling interval $T_{SAMPLE}$ may be 256 milliseconds.

In an embodiment wherein a piecewise linear estimation of the drift of the sleep clock signal CK is performed, the controller circuit 104 determines a final sleep interval duration $T_{FINAL}$ according to a difference between the target sleep time $T_{SLEEP}$ and a sum of the expected duration of the previous sampling intervals and the cumulative error value CERR, as shown in Equation 10, below:

$$T_{FINAL} = T_{SLEEP} - (N_{SI} \cdot T_{SAMPLE} + CERR)$$ (Equation 10).

The controller circuit 104 then determines a final wakeup count value CT2 according to the final sleep interval duration $T_{FINAL}$ and the fourth measured frequency value MF4, as shown in Equation 11a:

$$CT2 = \left\lfloor \frac{T_{FINAL}}{MF4} \right\rfloor.$$ (Equation 11a)

In an embodiment, the accurate clock circuit 106 remains turned on after the third sleep reentry time T3s and the wakeup counter circuit 112 generates the wakeup signal WAKE at a fourth wakeup time T4w according to a count of a number of clock cycles of the accurate clock signal CKM. A final wakeup accurate count value CT2' is determined according to a frequency $F_{CKM}$ of the accurate clock signal CKM and the final sleep interval duration $T_{FINAL}$ as shown in Equation 11b:

$$CT2' = \left\lfloor \frac{T_{FINAL}}{F_{CKM}} \right\rfloor.$$ (Equation 11b)

In an embodiment, the wakeup counter circuit 112 generates the wakeup signal WAKE at a fourth wakeup time T4w using both the sleep clock signal CK and the accurate clock signal CKM. A final wakeup combined clock count value includes a first value corresponding to a number of clock cycles of the sleep clock signal CK and a second value corresponding to a number of the accurate clock signal CKM. A person of skill in the art in light of the teachings and disclosures herein would understand how to generate the final wakeup combined clock count value and how to implement the wakeup counter circuit 112 configured to generate the a wakeup signal WAKE at the fourth wakeup time T4w according to the final wakeup combined clock count value.

In another embodiment wherein a nonlinear estimation of the drift of the sleep clock signal CK is performed, the controller circuit 104 determines the cumulative error value CERR according to a curve fitting process using the first, second, third, and fourth measured frequency values MF1, MF2, MF3, and MF4.

In an embodiment, determining the cumulative error value CERR using piecewise linear estimation or using curve fitting includes the electronic system 100 or portions thereof (such as the processor 124, the memory 122, or both) exiting the sleep mode for a predetermined period of time and performing computations using the accurate clock signal CKM. In an embodiment, the calculations to determine the final wakeup count value CT2 or the final wakeup accurate count value CT2' are performed after the fourth measured frequency value MF4 has been determined. In another embodiment, determining the cumulative error value CERR using piecewise linear estimation or using curve fitting may be performed without the electronic system 100 exiting the sleep mode, depending on an accuracy requirement and a complexity of the electronic system 100.

A person of skill in the art in light of the teachings and disclosures herein would understand how to perform a curve fitting process to fit a quadratic or higher order polynomial function to the first, second, third, and fourth measured frequency values MF1, MF2, MF3, and MF4, and how to determine the cumulative error value CERR using the polynomial function produced by the curve fitting process.

Furthermore, in an embodiment having four or more measured frequency values, a person of skill in the art in light of the teachings and disclosures herein would understand how to perform a plurality of piecewise curve fitting process to fit successive sequences of the measured frequency values to a plurality of quadratic or higher order polynomial functions, and how to determine the cumulative error value CERR using the plurality of polynomial functions produced by the curve fitting processes.

A person of skill in the art would also understand how to fit one or more other types of functions, such as exponential functions, to the plurality of measured frequency values, and how to use the one or more other types of functions to determine the cumulative error value CERR.

Figure 3:
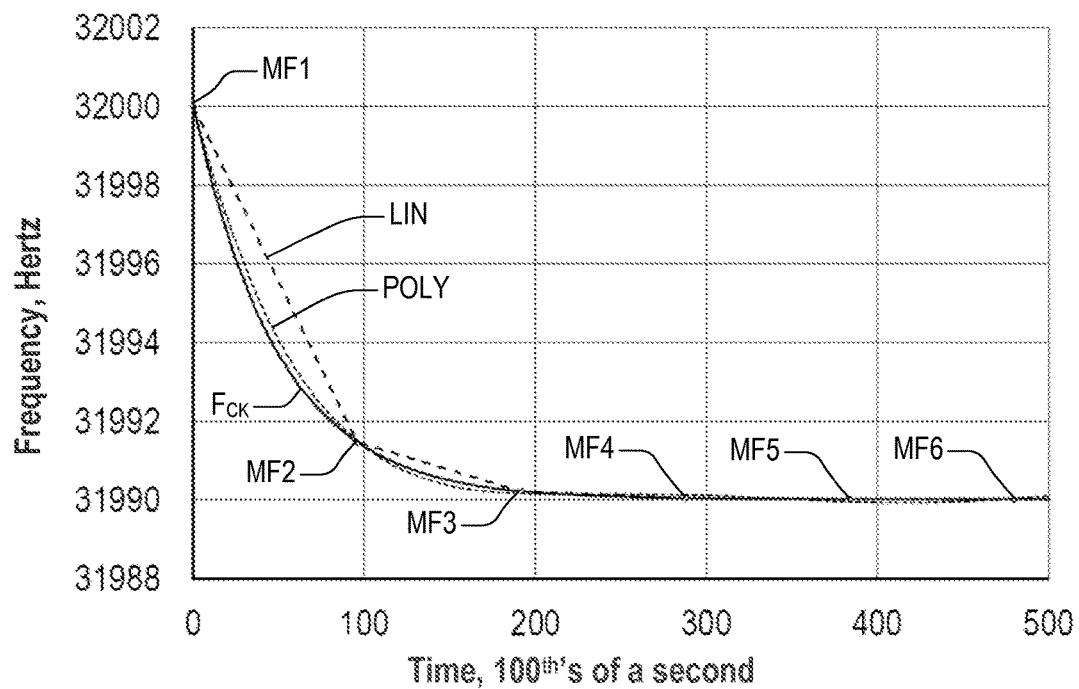
FIG. 3 is a graph comparing a piecewise linear estimate of a clock frequency to an estimate of the clock frequency obtained using curve fitting.

FIG. 3 is a graph comparing a piecewise linear estimate of a clock frequency of the sleep clock signal CK to an estimate of the clock frequency obtained using curve fitting. In FIG. 3, a solid line labeled $F_{CK}$ shows the frequency of the sleep clock signal CK after the electronic system 100 enters the sleep mode. The change in the frequency of the sleep clock signal CK may be due to, for example, a decrease in a temperature of the electronic system 100 caused by a decrease in a power dissipation of the electronic system 100 when in the sleep mode.

A first measured frequency MF1 and second through sixth measured frequencies MF2 through MF6 are values of measurements of the sleep clock signal CK taken immediately before the electronic system 100 entered the sleep mode and after first through fifth sampling intervals, respectively. The coarser dashed line LIN shows a piecewise linear estimate of the frequency of the sleep clock signal CK based on the first through sixth measured frequencies MF1 through MF6. A finer dashed line POLY shows an estimate of the frequency of the sleep clock signal CK according to a polynomial function determined by a curve fitting process using the first through sixth measured frequencies MF1 through MF6.

As can be seen in FIG. 3, the polynomial function shown by the line POLY provides a more accurate estimate of the frequency of the sleep clock signal CK than the piecewise linear estimate shown by the line LIN. As a result, a determination of the cumulative error value CERR using a curve-fit polynomial function may be more accurate than a determination of the cumulative error value CERR using a piecewise linear estimate.

Returning to FIG. 2, after the cumulative error value CERR is determined using the one or more curve fitting processes, the final wakeup count value CT2 may be determined according to Equations 10 and 11a, above. In an embodiment, the final wakeup accurate count value CT2' is determined instead, according to Equations 10 and 11b.

After the final wakeup count value CT2 is determined, at a third sleep reentry time T3s, the controller circuit 104 provides the final wakeup count value CT2 to the wakeup counter circuit 112 as the wakeup count value WCNT, exits the sleep clock measurement mode, and continues operating in the sleep mode. In an embodiment, after the final wakeup accurate count value CT2' is determined, the controller circuit 104 instead provides the final wakeup accurate count value CT2' to the wakeup counter circuit 112 as the wakeup count value WCNT, and does not turn off the accurate clock circuit 106 at the third sleep reentry time T3s.

At the fourth wakeup time T4w, the wakeup counter circuit 112 determines that a count of clock cycles of the sleep clock signal CK is equal to or greater than the final wakeup count value CT2 and as a result asserts the wakeup signal WAKE. In an embodiment, wherein the final wakeup accurate count value CT2' is provided to the wakeup counter circuit 112 as the wakeup count value WCNT, the wakeup counter circuit 112 instead determines that a count of clock cycles of the accurate clock signal CKM is equal to or greater than the final accurate wakeup count value CT2' and as a result asserts the wakeup signal WAKE.

In response to the assertion of the wakeup signal WAKE at the fourth wakeup time T4w, the controller circuit 104 determines that the target sleep time $T_{SLEEP}$ has elapsed and exits the sleep mode, placing the electronic system 100 in the normal operation mode.

Figure 4:
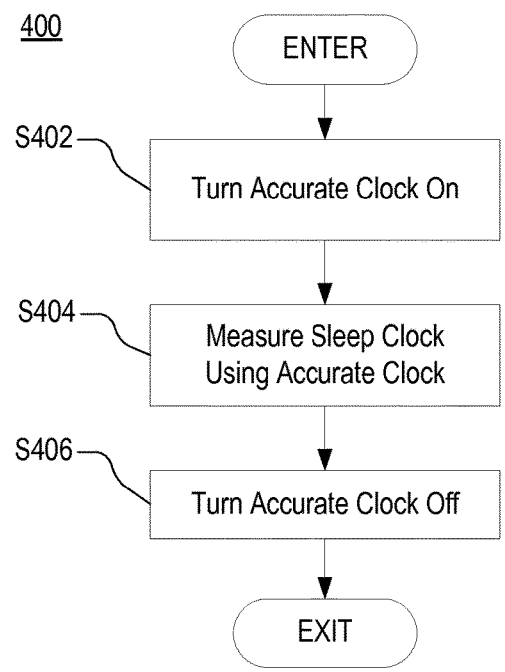
FIG. 4 is a flowchart of a process of measuring a sleep clock signal using an accurate clock signal according to an embodiment.

FIG. 4 is a flowchart of a process 400 for measuring a sleep clock signal using an accurate clock signal according to an embodiment. The process 400 is suitable for use in the electronic system 100 of FIG. 1 to measure the sleep clock signal CK using the accurate clock signal CKM.

At S402, the accurate clock is turned on. Turning on the accurate clock may include one or more of enabling an oscillator circuit, enabling a Phased Locked Loop (PLL) circuit or Delay Locked Loop (DLL) circuit, and providing a power supply voltage to a circuit.

After the accurate clock is operating and producing the accurate clock signal having a stable frequency, at S404, a count of a number of transitions of the accurate clock signal occurring between first and second transitions of the sleep clock signal is determined. In an embodiment, the first and second transitions correspond to successive rising edges, successive falling edges, or successive rising and falling edges of the sleep clock signal, respectively; that is, the count is the number of transitions of the accurate clock signal occurring during a clock cycle or half a clock cycle of the sleep clock signal. In another embodiment, the count is the number of transitions of the accurate clock signal occurring during a plurality of clock cycles of the sleep clock signal.

In an embodiment, the count is provided as the measured value of the sleep clock signal. In another embodiment, a frequency or a cycle time determined using the count is provided as the measured value of the sleep clock signal.

After the measured value is provided, at S406, the accurate clock it turned off. Turning off the accurate clock may include one or more of disabling an oscillator circuit, disabling a PLL circuit or DLL circuit, and discontinuing the providing of a power supply voltage to a circuit.

FIG. 5 is a flowchart of a process 500 for determining a wakeup time using drift estimation according to an embodiment. The process 500 is suitable for use in the electronic system 100 of FIG. 1 to wake up the electronic system 100 after a target sleep duration.

At S502, a pre-sleep measurement of a sleep clock signal is performed using an accurate clock signal, and the measurement is stored in a memory such as, for example, the memory 120 of the electronic system 100 of FIG. 1. In an embodiment, the measurement is performed using the process 400 shown in FIG. 4.

At S504, an initial wakeup count and a number of measurement intervals is determined according to one or more of the target sleep duration and an estimate of a future frequency of the sleep clock signal. The initial wakeup count and the number of measurement intervals are determined such that the target sleep duration is greater than a duration of an initial sleep interval, the duration of the initial sleep interval being equal to the product of a sampling interval determined by the initial wakeup count and the number of measurement intervals. In an embodiment, a difference between the target sleep duration and the duration of the initial sleep interval is less than or equal to the sampling interval determined by the initial wakeup count.

In an embodiment, a predetermined measurement period is provided, the initial wakeup count is determined according to the predetermined measurement period and the estimate of the future frequency of the sleep clock signal, and the number of measurement intervals is determined according to the predetermined measurement period and the target sleep duration.

In another embodiment, the number of measurement intervals is a predetermined value, and a measurement period is determined according to the target sleep duration, the number of measurement intervals, and a buffer interval. In an embodiment, the sum of the buffer interval and a product of the measurement period and the number of measurement intervals is less than the target sleep duration. The initial wakeup count is determined according to the measurement period and the estimate of the future frequency of the sleep clock signal.

At S506, the initial wakeup count is stored as a wakeup target value in an electronic circuit including a wakeup counter. In an embodiment, the wakeup counter, when activated, is configured to count transitions of the sleep clock signal, and when a count of the transitions is equal to or greater than the wakeup target value, to generate a wakeup signal, reset the count of the transitions, and then resume counting the transitions.

At S510, a sleep mode is entered. In an embodiment, the wakeup counter is activated shortly before the sleep mode is entered. The sleep clock signal and the wakeup counter continue to operate during the sleep more.

When a wakeup signal is generated by the wakeup counter, at S512, a measurement mode is entered. When the measurement mode is a sub-mode of the sleep mode, portions of the circuits may operate during the measurement mode while not operating during the remaining portions of the sleep mode.

At S514, another measurement of the sleep clock signal is performed using the accurate clock signal, and the measurement is stored in the memory. In an embodiment, the measurement is performed using the process 400 shown in FIG. 4.

In an embodiment, performing the measurement at S514 may be skipped if, after a previous measurement of the sleep clock signal, it is determined that the frequency of the sleep clock signal is sufficiently predictable. For example, if it is determined that the frequency of the sleep clock signal does not substantially vary after the previous measurement of the sleep clock signal, the measurement at S514 may be skipped.

At S516, whether the most recent measurement taken at S514, that is, the current measurement, is a last measurement is determined. In an embodiment, whether the current measurement is the last measurement is determined by comparing a count of the wakeup signals generated since S506 to the number of measurement intervals.

When the current measurement is not the last measurement, at S518 the measurement mode is exited, and the process 500 proceeds to S512 and continues operating in the sleep mode while waiting for the next wakeup signal to be generated.

In an embodiment, when the current measurement is not the last measurement, whether a future measurement of the frequency of the sleep clock signal can be predicted with a predetermined degree of accuracy is determined. When one or more future measurements of the frequency of the sleep clock signal are determined to be predictable with the predetermined degree of accuracy, a determination to skip the one or more future measurements may be made, resulting in reduced power consumption.

For example, when one or more of the most recent prior measurement of the frequency of the sleep clock signal are substantially equal to the current measurement, it may be determined that one or more future measurements of the frequency of the sleep clock signal will be skipped. In another example, when three or more of the most recent measurement of the frequency of the sleep clock signal indicate that the frequency of the sleep clock signal is changing in a linear fashion, it may be determined that one or more future measurements of the frequency of the sleep clock signal will be skipped. A person of skill in the art in light of the teachings and disclosures herein would be aware of other criteria for determining whether one or more future measurements of the frequency of the sleep clock signal are predictable with the predetermined degree of accuracy When the current measurement is the last measurement, at S520 a cumulative error due to a drift of the sleep clock signal is determined. In an embodiment, the cumulative error is determined using a plurality of piecewise linear estimates of frequencies of the sleep clock signal using the measurements of the sleep clock signal produced at S504 and S514. In another embodiment, the cumulative error is determined using a polynomial function or a transcendental function fit, using a curve fitting process, to the measurements of the sleep clock signal produced at S504 and S514.

At S522, a final wakeup count is determined based on the cumulative error. In an embodiment, the final wakeup count is determined by subtracting a sum of the cumulative error and a product of the number of measurement intervals and the measurement period from the target sleep duration to produce a final sleep interval, and then determining the final wakeup count according to the final sleep interval and either an estimate of a frequency of the sleep clock signal during the final sleep interval, a frequency of the accurate clock signal, or both. The estimate of a frequency of the sleep clock signal during the final sleep interval may be determined using the most recent measurement of the sleep clock signal or using an extrapolated frequency curve determined using a plurality of measurements of the sleep clock signal.

At S524, the final wakeup count is stored as the wakeup target value in the electronic circuit including the wakeup counter. The wakeup counter continues to count transitions of the sleep clock signal. In an embodiment, the wakeup counter instead counts transitions of the accurate clock signal.

At S526, the measurement mode is exited and the sleep mode is reentered. In an embodiment, the accurate clock signal continues to be provided after S526.

When the wakeup counter's count of the transitions of the sleep clock signal or the accurate clock signal, or both, is equal to or greater than the updated wakeup target value, the wakeup counter generates the wakeup signal, and at S528, the sleep mode is exited.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. An apparatus comprising:
   a sleep clock circuit configured to generate a sleep clock signal; and
   an accurate clock circuit configured to generate an accurate clock signal when the accurate clock circuit is turned on;
   wherein the apparatus is configured to:
      enter a sleep mode,
      generate a plurality of sleep clock measurements by measuring the sleep clock signal using the accurate clock signal during an initial sleep interval occurring during the sleep mode, the initial sleep interval including a plurality of sampling intervals, and the plurality of sleep clock measurements being generated during the plurality of sampling intervals, respectively,
      determine a plurality of error values, each of the plurality of error values being determined according to two or more successive sleep clock measurements after the two or more successive sleep clock measurements have been performed,
      estimate a cumulative error according to the plurality of error values, and
      determine a final sleep interval according to the cumulative error.

2. The apparatus of claim 1, wherein measuring the sleep clock signal using the accurate clock signal while in the sleep mode includes turning on the accurate clock circuit, generating a count of transitions of the accurate clock signal that occur during one or more clock cycles of the sleep clock signal, and turning off the accurate clock circuit, the accurate clock signal being substantially independent of changes in a value of a power supply voltage, a temperature, or the power supply voltage and the temperature.

3. The apparatus of claim 1, further including a wakeup counter circuit configured to receive the sleep clock signal and periodically generate a wakeup signal according to the sleep clock signal,
   wherein the apparatus is configured to measure the sleep clock signal using the accurate clock signal when the wakeup counter circuit generates the wakeup signal while the apparatus is in the sleep mode.

4. The apparatus of claim 1, wherein the apparatus is configured to measure the sleep clock signal to produce a pre-sleep measurement of the sleep clock signal using the accurate clock signal before entering the sleep mode, and
   wherein the cumulative error is estimated according to the pre-sleep measurement of the sleep clock signal.

5. The apparatus of claim 1, wherein estimating the cumulative error includes estimating, using a piecewise linear estimate based on two of the plurality of sleep clock measurements, a frequency of the sleep clock signal or a cycle time of the sleep clock signal.

6. The apparatus of claim 1, wherein estimating the cumulative error includes estimating, using a curve fitting process based on the plurality of the sleep clock measurements, a frequency of the sleep clock signal or a cycle time of the sleep clock signal.

7. The apparatus of claim 1, wherein the accurate clock circuit is a clock circuit of a communication subsystem of the apparatus.

8. The apparatus of claim 1, wherein each of the plurality of error values varies according to the two or more successive sleep clock measurements.

9. The apparatus of claim 1, further including:
   a processor; and
   a non-transitory computer-readable media,
   wherein operations of the apparatus are performed by the processor executing computer programming instructions stored in the non-transitory computer-readable media.

10. The apparatus of claim 1, wherein the apparatus is provided in an integrated circuit.

11. The apparatus of claim 1, wherein the plurality of sleep clock measurements corresponds to a plurality of respective frequencies of the sleep clock signal or a plurality of respective cycle times of the sleep clock signal.

12. A method of providing an accurate wakeup time, comprising:
   determining a duration of an initial sleep interval using a controller circuit, wherein the initial sleep interval includes a plurality of sampling intervals;
   generating a plurality of measurements of a sleep clock signal using an accurate clock signal, the plurality of measurements of the sleep clock signal being generated during the plurality of sampling intervals, respectively;
   determining an initial wakeup count value according to the duration of the initial sleep interval, a number of the sampling intervals, and an estimate of a frequency of the sleep clock signal;
   generating a first wakeup signal according to the sleep clock signal and the initial wakeup count value;
   determining, when the first wakeup signal occurs, to skip generating the measurements of the sleep clock signal when a second wakeup signal occurs, the second wakeup signal being generated after the first wakeup signal is generated;

determining a plurality of error values, each of the plurality of error values being determined according to two or more successive measurements of the sleep clock signal;

generating a cumulative error value according to the plurality of error values; and determining a duration of a final sleep interval according to the cumulative error value.

13. The method of claim 12, wherein generating the cumulative error value includes estimating, using the plurality of measurements of the sleep clock signal, a plurality of frequencies of the sleep clock signal.

14. The method of claim 13, further including estimating the plurality of frequencies of the sleep clock signal according to a piecewise linear estimation based on the plurality of measurements of the sleep clock signal.

15. The method of claim 13, further including estimating the plurality of frequencies of the sleep clock signal according to a result of a curve fitting process applied to the plurality of measurements of the sleep clock signal.

16. The method of claim 12, wherein generating the plurality of measurements of the sleep clock signal during the initial sleep interval includes:

turning on an accurate clock circuit to generate the accurate clock signal;

generating the measurements according to a count of transitions of the accurate clock signal occurring between first and second transitions of the sleep clock signal; and turning off the accurate clock circuit.

17. The method of claim 12, further comprising:

determining a count of transitions of the sleep clock signal; and resetting the count of transitions of the sleep clock signal and generating a measurement of the plurality of measurements of the sleep clock signal when the wakeup signal is generated during the initial sleep interval, wherein generating the first wakeup signal comprises generating the first wakeup signal according to the count of transitions of the sleep clock signal and the initial wakeup count value.

18. The method of claim 17, further comprising:

generating the second wakeup signal according to the count of transitions of the sleep clock signal and the initial wakeup count value; and resetting the count of transitions of the sleep clock signal when the second wakeup signal is generated during the initial sleep interval.

19. The method of claim 12, further comprising:

determining a final wakeup count value according to the duration of the final sleep interval and a frequency of the accurate clock signal, the estimate of the frequency of the sleep clock signal, or both;

determining a count of transitions of the accurate clock signal, the sleep clock signal, or both; and generating a final wakeup signal according to the count of the transitions and the final wakeup count.

20. The method of claim 12, further comprising generating the sleep clock signal using a ring oscillator or a relaxation oscillator.

21. The method of claim 12, wherein a difference between the duration of the initial sleep interval and a sleep target duration is less than a duration of a sampling interval of the plurality of sampling intervals, and wherein the final sleep interval is determined based on a difference between the sleep target duration and a sum of the duration of the initial sleep interval and the cumulative error value.

* * * * *